(12) United States Patent
Matsumura

(10) Patent No.: US 6,578,612 B1
(45) Date of Patent: Jun. 17, 2003

(54) PNEUMATIC RADIAL TIRE HAVING SIX BLOCK ROWS

(75) Inventor: Tomoyuki Matsumura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/468,939

(22) Filed: Dec. 22, 1999

(30) Foreign Application Priority Data

| Dec. 25, 1998 | (JP) | 10-369621 |
| Jan. 28, 1999 | (JP) | 11-019870 |
| Jan. 28, 1999 | (JP) | 11-019872 |
| Jan. 28, 1999 | (JP) | 11-019882 |
| Jan. 28, 1999 | (JP) | 11-019886 |
| Jan. 29, 1999 | (JP) | 11-022816 |

(51) Int. Cl.$^7$ ............... B60C 11/11; B60C 11/12; B60C 101/00; B60C 107/00; B60C 113/00

(52) U.S. Cl. ............... 152/209.2; 152/209.14; 152/209.18; 152/209.27; 152/526; 152/902; 152/DIG. 3

(58) Field of Search ............... 152/209.2, 209.3, 152/209.14, 209.18, 209.27, 209.1, 902, DIG. 3, 526, 538

(56) References Cited

U.S. PATENT DOCUMENTS

| 1,956,011 | A | * | 4/1934 | Evans ............... 152/209.3 |
| 4,122,879 | A | * | 10/1978 | Takigawa et al. ............ 152/902 |
| 4,819,704 | A | * | 4/1989 | Misawa et al. ............. 152/902 |
| 4,913,208 | A | * | 4/1990 | Anderson et al. |
| 5,209,793 | A | * | 5/1993 | Cusimano ............... 152/209.2 |
| 5,309,963 | A | * | 5/1994 | Kakumu et al. ............ 152/902 |
| 5,353,855 | A | * | 10/1994 | Kajiwara et al. ........... 152/527 |
| 5,526,860 | A | * | 6/1996 | Minami ............... 152/209.27 |
| 5,538,060 | A | * | 7/1996 | van der Meer et al. ..... 152/902 |
| 5,571,351 | A | * | 11/1996 | Hatakenaka et al. ........ 152/902 |
| 5,964,266 | A | * | 10/1999 | Boiocchi et al. ......... 152/209.2 |

FOREIGN PATENT DOCUMENTS

| DE | 3424796 | * | 1/1985 | ............ 152/209.18 |
| EP | 591002 | * | 4/1994 | ............ 152/209.3 |
| JP | 59-63206 | * | 4/1984 | ............ 152/209.2 |
| JP | 63-125411 | * | 5/1988 | ............ 152/209.2 |
| JP | 63-184505 | * | 7/1988 | ............ 152/209.14 |
| JP | 11-348510 | * | 12/1999 | ............ 152/902 |

* cited by examiner

Primary Examiner—Steven D. Maki
(74) Attorney, Agent, or Firm—Rader, Fishman & Grauer PLLC

(57) ABSTRACT

A pneumatic radial tire, wherein five main grooves extending in the circumferential direction of a tire are provided on a tread to divide into and form land portions of six rows, each land portion is divided into block rows constituted by a plurality of blocks by means of a plurality of subgrooves extending in the direction of width of the tire, and an area ratio of the blocks is set at a relationship of 1:0.9 to 1.1:1.8 to 2.2 from the block row of the shoulder side to the block row of the center side, in a region between ends of a belt layer having a maximum width embedded in said tread.

7 Claims, 18 Drawing Sheets

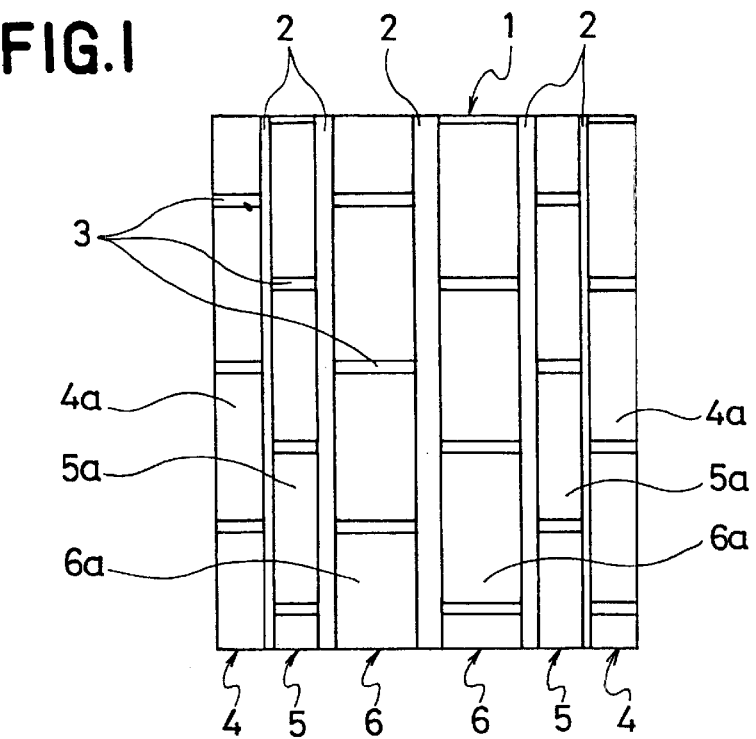
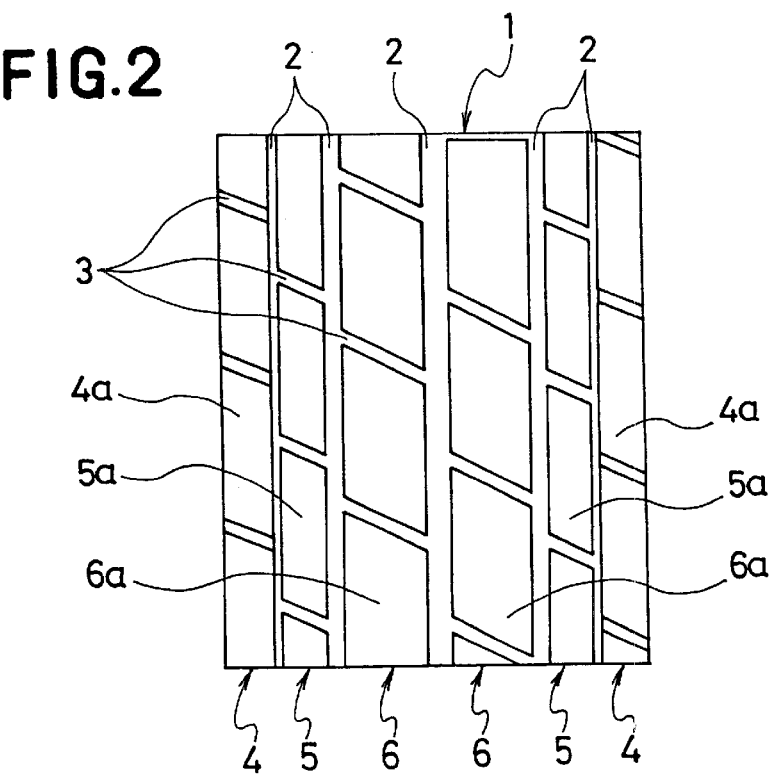

Inclining angle of subgroove with respect to cord direction of belt layer of most outside (°)

Variation ratio of the total ground length at the ground front edge (%)

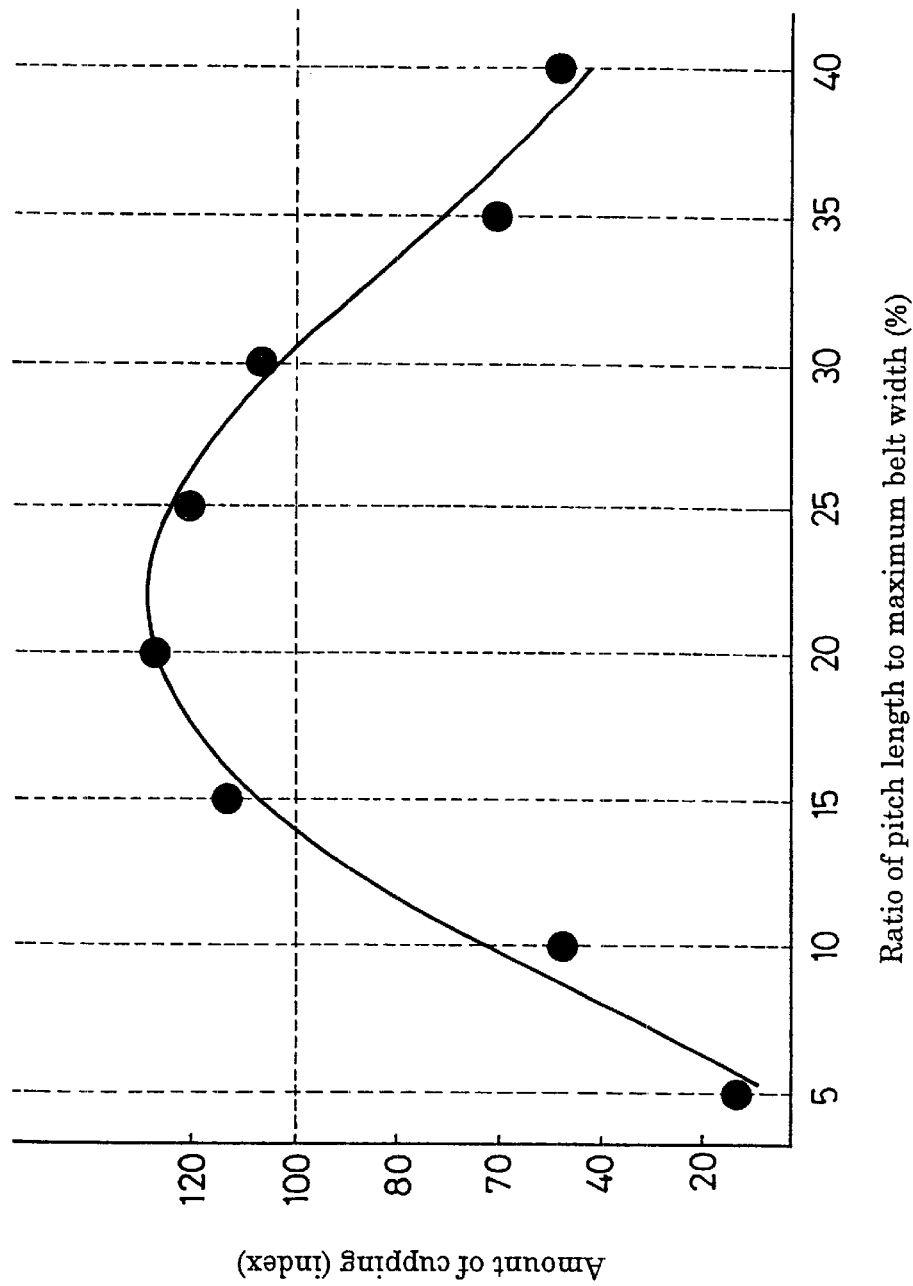

PNEUMATIC RADIAL TIRE HAVING SIX BLOCK ROWS

BACKGROUND OF THE INVENTION

The present invention relates to a pneumatic radial tire having block patterns and more particularly to the pneumatic radial tire which makes it possible to improve wear resistance without affecting driving performance virtually.

In general, with the pneumatic radial tire, center wear and uneven wear are occurred on a tread, and it is a determined to be wear life when at least a portion of those wear is reached the minimum-required groove depth. Accordingly, various methods for prolonging the wear life by changing tread extension width and groove area have been proposed.

However, there have been problems that extending the tread extension width leads to increases in weight and cost, as well as the tire becomes tendency to be trapped by a rut, as a result, the so called rut-wandering property is deteriorated, on the other hand, reducing groove area decreases a traction performance and a driving performance on a wetted road surface, for example. Moreover, there has been a disadvantage that, although wear resistance can be improved in the case of constituting directional tread patterns which a tire rotation direction is specified, constraints on use of the tire are increased.

SUMMARY OF THE INVENTION

The object of the invention is to provide a pneumatic radial tire which makes it possible to improve wear resistance without affecting a driving performance virtually.

The pneumatic radial tire according to the invention for accomplishing the object described above, comprises a constitution wherein five main grooves extending in the circumferential direction of a tire are provided on a tread to divide into and form land portions of six rows, each land portion is divided into block rows constituted by a plurality of blocks by means of a plurality of subgrooves extending in the direction of width of the tire so as to define a first block at each shoulder side, a second block row at each shoulder side and a block row at a center side, and an area ratio of the blocks is set at a relationship of 1:0.9 to 1.1:1.8 to 2.2 of the blocks of the first block row at the shoulder side to the blocks of the second block row at the shoulder side to the blocks of the block row at the center side, in a region between ends of a belt layer having a maximum width embedded in said tread.

As described above, even though the tire performance such as the traction performance can be reserved by increasing the ratio of the groove area by setting the area ratio of the blocks at the relationship of 1:1:2 (the variation within the range of ±10% will be permitted) from the block row of the shoulder side to the block row of the center side, the wear resistance can be improved.

According to the invention, the area of each block, the total area of the tread and the groove area of the tread or the like have been measured in the region between the ends of the belt layer having the maximum width in the belt layer embedded in said tread. This region between the ends of the belt layer having the maximum width is substantially matched to a ground region where using the tire.

According to the invention, each land portion is divided into a plurality of blocks mainly using a plurality of subgrooves, which these plurality of subgrooves may be used with siping which are a direct extension thereof at the same time. Thus, the siping which are a direct extension of the subgroove behave with the subgroove, the siping contribute to dividing the blocks adjoining each other. Moreover, the siping which is not on an extension line of the groove, for example, the siping intersecting the groove and the siping being independently without communicating with the groove, may be provided as required in the blocks. Since an interval of such siping is not only narrow, but also behaves independently from the groove, the siping has no action capable of dividing the blocks into the further small blocks. Moreover, a groove which is narrower than the subgroove and is not more than 2.0 mm in width is referred to as a sipe.

BRIEF DESCRIPTION OF THE DRAWINGS

FIG. 1 is a spread view showing a basic tread pattern of a pneumatic radial tire according to the invention.

FIG. 2 is a spread view showing a modification of the basic tread pattern of the pneumatic radial tire according to the invention.

FIG. 20 is a graph showing a relationship between a ratio of a pitch length with respect to the maximum belt width and an amount of cupping (an index).

DETAILED DESCRIPTION OF THE PREFERRED EMBODIMENT

Figure 3:
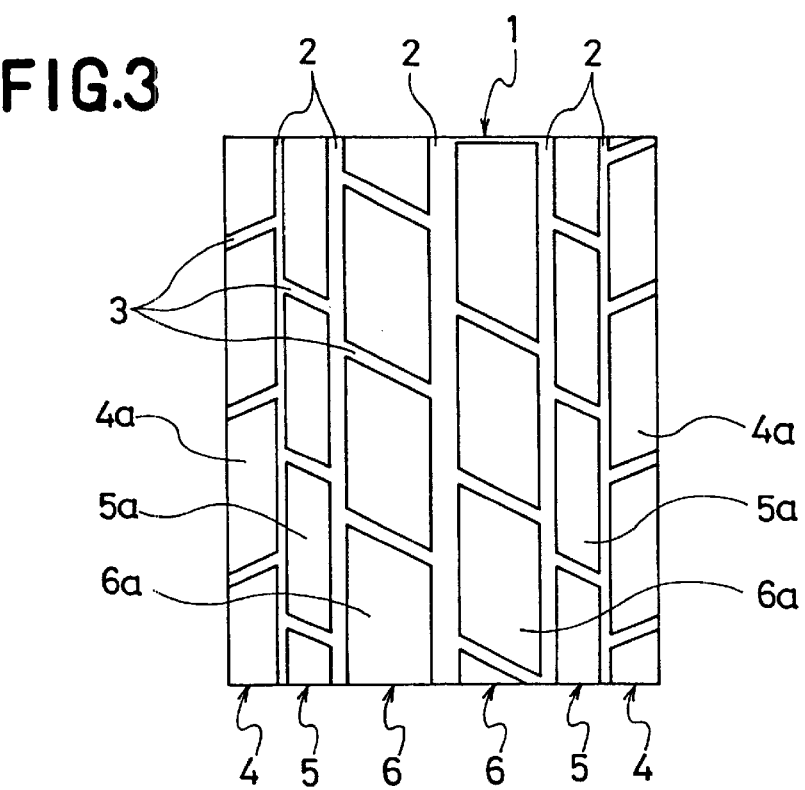
FIG. 3 is a spread view showing a modification of the basic tread pattern of the pneumatic radial tire according to the invention.

FIG. 1 is a view illustrating a basic structure of a tread pattern in a pneumatic radial tire according to the invention. Referring to FIG. 1, five main groove 2 extending in a circumferential direction of a tire are provided on a tread 1, in which land portions of six rows are divided and formed by these main groove 2.

Moreover, a plurality of subgroove 3 extending in the direction of width of the tire are provided on a tread 1, and by these subgroove 3, a most-shoulder-side land portion is divided into a first block row 4 constituted by a plurality of blocks 4a, the land portion inside thereof is divided into a second block row 5 constituted by a plurality of blocks 5a, and a most-center-side land portion is divided into a block row 6 constituted by a plurality of blocks 6a. In each block row 4, 5 and 6, pitches of the subgroove 3 in the circumferential direction of the tire are designed to formed approximately same.

In the described-above pneumatic radial tire, an area ratio of the blocks 4a, 5a and 6a has been set at the relationship of 1:1:2 (the variation within the range of ±10% will be permitted) from the first block row 4 at the shoulder side to the second block row 5 to the block row 6 at the center side. Thus, occurrence of center wear and uneven wear are suppressed by setting the area ratio of the block 4a, 5a and 6a at the relationship of 1:1:2 (the variation within the range of ±10% will be permitted) from the shoulder side to the center side, whereby the wear resistance can be prolonged. However, when the area ratio of the blocks 4a, 5a and 6a is deviated in excess of 10% from the described-above relationship, an improvement effect of wear resistance can not be obtained.

As described above, when the pitches of the subgroove 3 in each block row 4, 5 and 6 are designed to formed approximately same, a length ratio of the blocks 4a, 5a and 6a in the tire width direction has been formed into a relationship of 1:1:2. Namely, the area ratio of each block 4a, 5a and 6a can be set at the relationship of 1:1:2, by respectively providing the main groove 2 on the position which the belt layer having the maximum width is divided into four pieces uniformly in the direction of width of the tire to set a area ratio of blocks of a shoulder portion and a center portion at 1:1, and respectively further providing the main groove 2 on the position which the blocks of the shoulder portion of both sides of the right and left is divided into two pieces uniformly in the direction of width of the tire.

In the invention, the ratio of the tread area versus the total groove area including the main groove 2 and the subgroove 3 preferably is set within the range of 25±10%. When this ratio of the groove area is not more than 15%, the traction performance and a driving performance on the wetted road surface is reduced, and in contrast with this, when 35% is exceeded, wear resistance is reduced. The ratio of the total area of the subgroove 3 versus the total area of the main groove 2 preferably is set within the range of 0.4 to 0.8. Thus, the best traction can be shown by setting the ratio of the total area of the subgroove 3 versus the total area of the main groove 2 within the described-above range.

Figure 4:
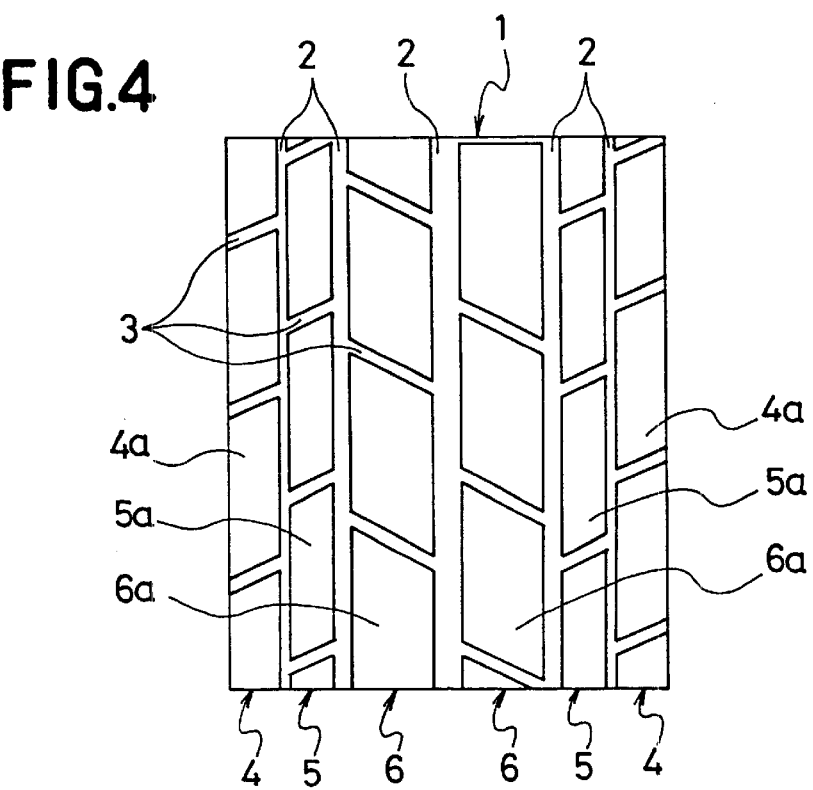
FIG. 4 is a spread view showing a modification of the basic tread pattern of the pneumatic radial tire according to the invention.

In the invention, as shown in FIG. 2 to FIG. 4, the tread pattern is formed such that the subgroove 3 can be inclined, and an inclining angle with respect to the circumferential direction of the tire of the subgroove 3 thereof preferably is set within the range of 65±10°. When the inclining angle of the subgroove 3 is not more than 55°, lateral rigidity is reduced to tend to result in uneven wear in the width direction of the tire, in contrast with this, when 75° is exceeded, the driving performance on the wetted road surface can become insufficient. According to the same reason, the ratio of the projected length when projecting to the direction of width of the tire versus the projected length when projecting to the circumferential direction of the tire of the subgroove 3 preferably is set at 0.6 to 0.8.

At the occasion of imparting the inclining angle to the subgroove 3, since handle slip can be occurred as shown in FIG. 2 when all the subgroove 3 are inclined in the same direction, the inclining direction of the subgroove 3 in the block row 4 of the shoulder side and in the block row 5 and 6 of the center side are formed in the different direction each other as shown in FIG. 3, or the inclining direction of the subgroove 3 is formed in the different direction each other in the block row 4 and 5 of the shoulder side and in the block row 6 of the center side as shown in FIG. 4, thereby the occurrence of handle slip preferably being prevented. Moreover, a revolution direction of the tread pattern according to the invention may be specified, but restrictions on use is increased in the case of a directional tread pattern, whereby non-directional tread pattern (Even inverting an installation direction for a vehicle, the same pattern can be kept) preferably is used.

Figure 5:
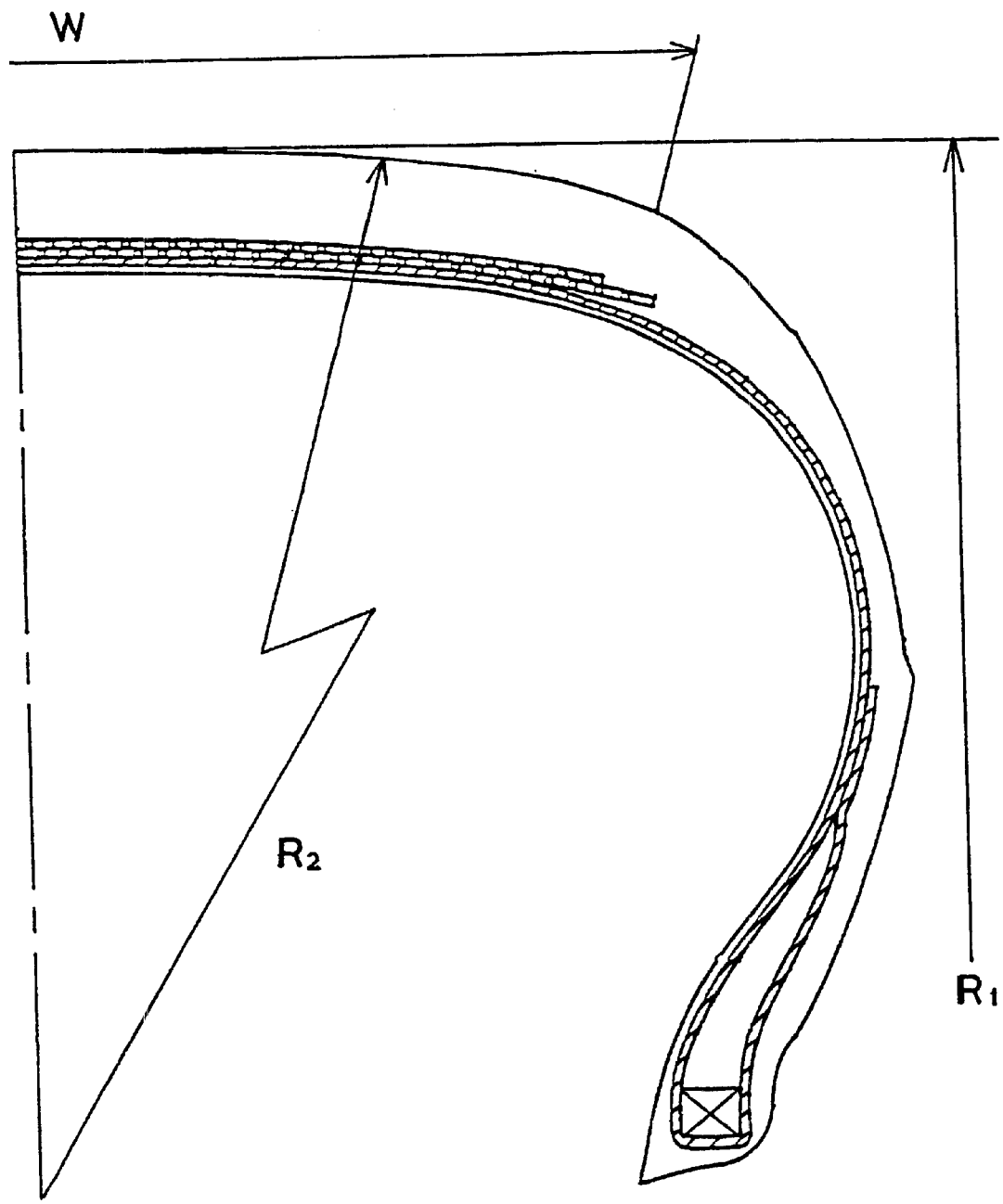
FIG. 5 is a half section along a meridian of an embodiment of the pneumatic radial tire according to the invention.

The invention preferably is applied to the pneumatic radial tire which a ratio R1/R2 of a radius R1 of the tire in a section along the equator of the tire and a radius R2 of the tread in a section along a meridian of the tire is set at 0.8 to 1.2 as shown in FIG. 5. The described-above tread pattern is applied to the pneumatic radial tire having such curve, thereby a prolonging effect of wear life being able to obtained significantly.

In the described-above pneumatic radial tire, the area of each block 4a, 5a and 6a, the total area of the tread 1 and the groove area of the tread 1 were measured within the region corresponding to the maximum belt width B as shown in FIG. 5.

Figure 6:
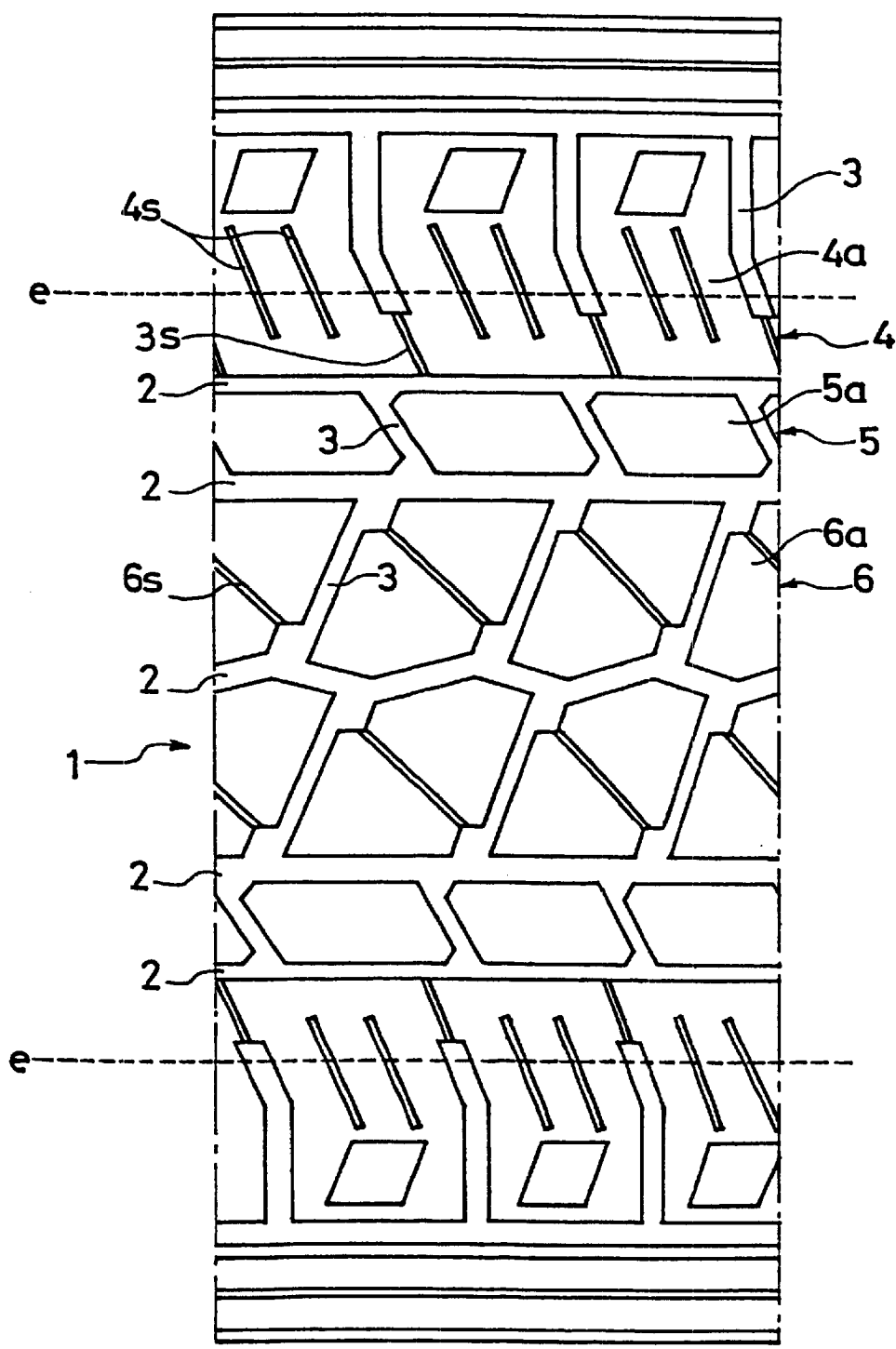
FIG. 6 is a spread view showing a tread pattern of the pneumatic radial tire according to an embodiment of the invention.

FIG. 6 is a view showing a tread pattern of the pneumatic radial tire according to an embodiment of the invention. Referring to FIG. 6, the tread 1 is constituted by cap compound of JIS-A hardness 50 to 75 in order to obtain excellent wear resistance. This tread 1 is provided with the five main grooves 2 extending in the circumferential direction of the tire, and the land portions of six rows are divided and formed by these main groove 2. The main groove 2 may be in straight form, or may be in zigzag form.

Moreover, a plurality of subgroove 3 extending in the direction of width of the tire are provided on the tread 1, and by these subgroove 3, a most-shoulder-side land portion is divided into a first block row 4 constituted by a plurality of blocks 4a, the land portion inside thereof is divided into a second block row 5 constituted by a plurality of blocks 5a, and a most-center-side land portion is divided into a block row 6 constituted by a plurality of blocks 6a. In each block row 4, 5 and 6, pitches of the subgroove 3 in the circumferential direction of the tire are designed to formed approximately same.

The blocks 4a, 5a and 6a can be provided, if necessary, with the siping which is narrower than the subgroove 3 and is not more than 2.0 mm in width. For example, the block 4a of the shoulder side are provided a plurality of siping 4s being independently without communicating with the groove in parallel with the subgroove 3. Moreover, a portion of the block 4a and 4a adjoining in the circumferential direction of the tire in the block row 4 of the shoulder side is divided by the siping 3s which is on the extension line of the subgroove 3. The block 6a of the center side is provided with the siping 6s crossing in the direction of a diagonal line of the blocks so as to intersect the subgroove 3 and the main groove 2.

A plurality of belt layers (not shown) are embedded in the tread 1, and the both ends "e" and "e" of the belt layer having the maximum width therein are positioned at the shoulder portion of the right and left. The region sandwiched between these belt ends is substantial the ground region.

In the region sandwiched between these belt ends "e" and "e" of the described-above pneumatic radial tire, a ratio of the tread area versus the total groove area including the main groove 2 and the subgroove 3 is set within the range of 25±10%. When this ratio of the groove area is not more than 15%, the traction performance and the driving performance on the wetted road surface is reduced, and in contrast with this, when 35% is exceeded, wear resistance is reduced.

In the region sandwiched between these belt ends "e" and "e", the area ratio of the blocks 4a, 5a and 6a is set at the relationship of 1:1:2 (the variation within the range of ±10% will be permitted) from the block row 4 of the shoulder side to the block row 6 of the center side, whereby the area ratio of the block has been formed into a relationship of 1:1:2:2:1:1 (the variation within the range of ±10% will be permitted) as a whole in the tread. Thus, occurrence of center wear and uneven wear are suppressed by setting the area ratio of the block 4a, 5a and 6a at the relationship of 1:1:2 (the variation within the range of ±10% will be permitted) from the shoulder side to the center side, whereby the wear resistance can be prolonged. However, when the area ratio of the blocks 4a, 5a and 6a is deviated in excess of 10% from the described-above relationship, an improvement effect of wear resistance can not come to be obtained.

Figure 7:
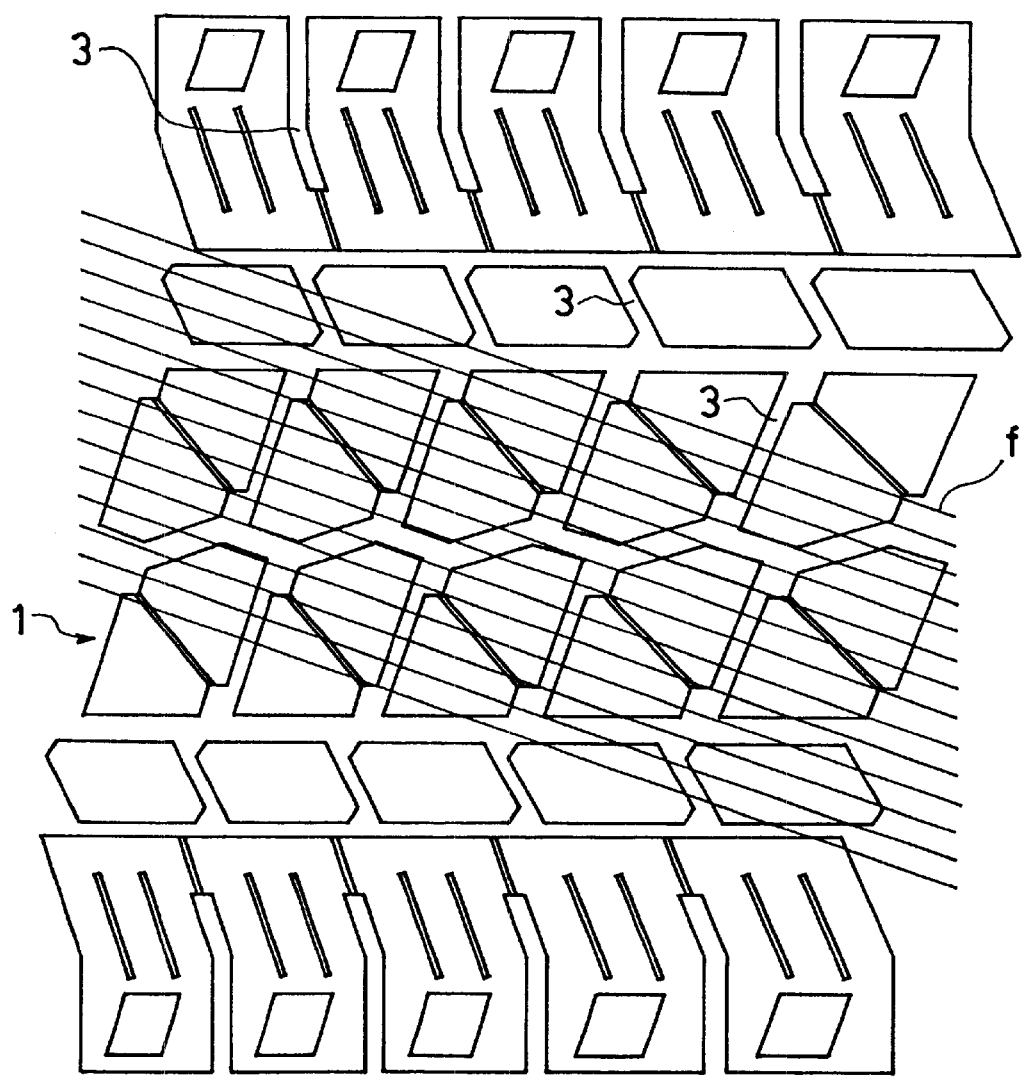
FIG. 7 is a spread view which projects a cord of a most outside belt layer to the tread pattern shown in FIG. 6.

A plurality of belt layers (not shown) are embedded in the tread 1 are constituted by a plurality of reinforcement cords inclining with respect to the circumferential direction of the tire, and the reinforcement cords are arranged so as to intersect each other between the layers. The inclining angle of the subgroove 3 is set within the range of 30 to 90°, preferably 45 to 90° when measured at an acute angle side, with respect to an orientation direction of a cord "f" of the belt layer being positioned at the most outside, in a plurality of belt layers as shown in FIG. 7. Thus, since the subgroove 3 is allowed to intersect with respect to the direction of the cord of the most outside belt layer, thereby the tread 1 becoming hard to bend relative to the subgroove 3, occurrence of buckling phenomena of the tread 1 can be suppressed. When this inclining angle of the subgroove 3 is not more than 30°, buckling phenomena become to tend to occur. Moreover, even though the inclining angle of the subgroove 3 is set within the range described-above, wear resistance improved as described above can not be impaired. Therefore, according to the above-described constitution, wear resistance is improved without affecting driving performance virtually, moreover, occurrence of buckling phenomena in the tread can be suppressed, whereby an adverse effect on an operation stability can be reduced.

As shown in FIG. 6, the inclining direction with respect to the circumferential direction of the tire of the subgroove 3 is set oppositely each other with the block row 6 of the center side and the block row 4 and 5 of the shoulder side. Thus, the inclining direction with respect to the circumferential direction of the tire of the subgroove 3 are set oppositely each other with the block 6 of the center side and the block 4 and 5 of the shoulder side, thereby handle slip can be prevented in the tread pattern having no directiveness. In this case, the inclining direction of the subgroove 3 with respect to the cord direction of the belt layer of the most outside is set larger in the block row 6 of the center side than in the block row 4 and 5 of the shoulder side. Since the block 6 of the center side is higher in a vertical pressure than the block 4 and 5 of the shoulder side, the inclining direction of the subgroove 3 with respect to the cord direction of the belt layer of the most outside is set larger in the block 6 of the center side, thereby occurrence of buckling phenomena being able to be prevented effectively.

Figure 8:
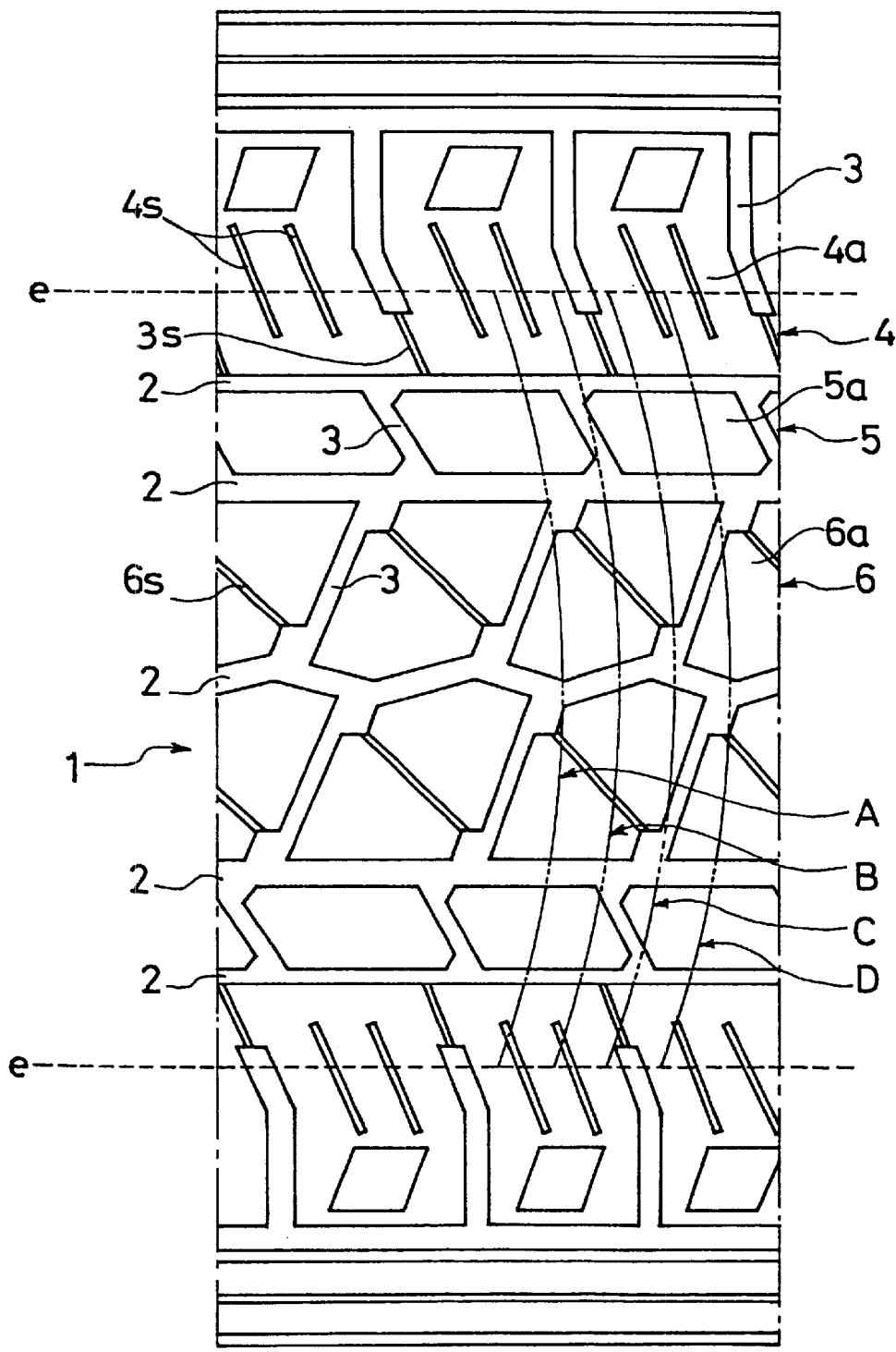
FIG. 8 is a spread view showing the tread pattern shown in FIG. 6 along with a ground front edge.

The pneumatic radial tire forms an arc-shaped ground front edge at the front side when rotating under a grounding condition. This ground front edge is moved toward the front side gradually with revolution of the tire. At this time, a total the ground length at the ground front edge is varied in response to revolution phase of the tire gradually. For example, since a ratio of the land portion and the groove is varied gradually at the ground front edge A to D as shown in FIG. 8, the total ground region length at the ground front edge A to D (the total length of the arc-shaped solid line portion) differs from each other variously. According to the invention, the blocks 4a and 5a and/or the blocks 5a and 6a adjoining each other under the condition of sandwiching the main groove 2 are arranged under the condition of shifting each other in the circumferential direction of the tire, thereby the variation ratio of the total ground length at the ground front edge in the region sandwiched between the belt ends "e" and "e" being set so as to become not more than 25% around one circumference of the tire.

Variation ratio of this total ground length is a ratio of width of deviation versus the maximum value of the total ground length around one circumference of the tire. For example, in the specified tire, when the maximum value the total ground length at the ground front edge is 100 mm, and the minimum value thereof is 90 mm, its variation ratio is 10%. However, the ground front edge is the boundary line of the ground region and non-ground region being formed when the air pressure corresponding to the maximum load ability is filled into the tire and the load of its maximum load ability is loaded in the Air Pressure-Load Ability Correspondence Table approved by JATMA Year Book (the 1998 edition). For example, the radius of the ground front edge is the range of 250 to 2000 mm.

As is mentioned above, the blocks 4a, 5a and 6a adjoining each other are arranged under the condition of shifting each other in the circumferential direction of the tire such that the variation ratio of the total the ground length at the ground front edge is set so as to become not more than 25% across one circumference of the tire, thereby the blocks 4a, 5a and 6a adjoining each other coming to step to a road surface with a time difference, and kicking out the road surface with a time difference. Therefore, the frequency that stepping and kicking out of the blocks is occurred simultaneously is reduced, whereby noise due to a hitting sound and a vibration sound of the blocks 4a, 5a and 6a can be reduced.

Moreover, in the described-above pneumatic radial tire, on a portion in the direction of width of the tire of the subgroove 3 being positioned at the block row 4a of the most-shoulder side, in the ground region sandwiched between the belt ends "e" and "e", siping is given to provide the structure that a sound is hard to be emitted from the subgroove 3 of the shoulder side, whereby a passing-through sound further can be reduced.

Figure 9:
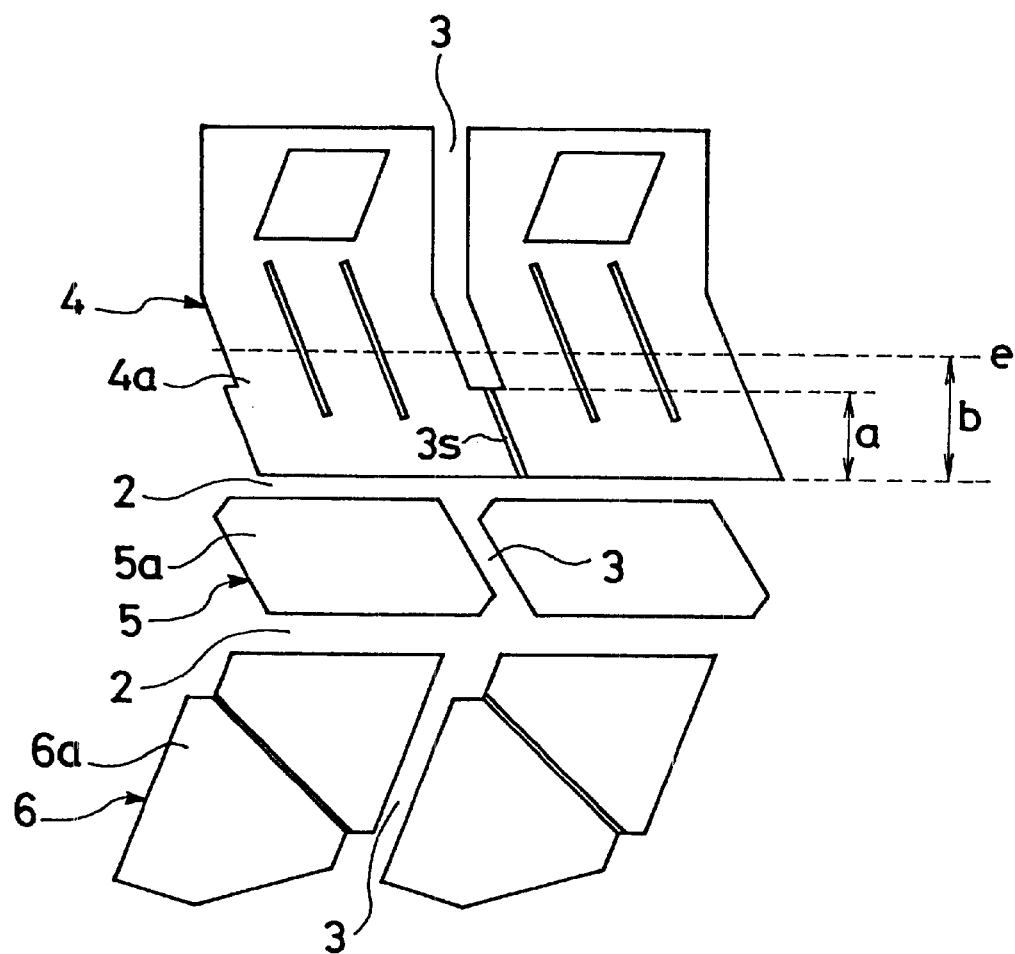
FIG. 9 is an enlarged plane view showing each block row of the tread pattern shown in FIG. 6.

Siping on the subgroove 3 preferably is performed on the inner portion of the stepping plane of the block 4a, and width "a" of the area on which siping is performed may be set at 60 to 80% of width "b" of the block within the region sandwiched between the belt ends "e" and "e" as shown in FIG. 9. When the width "a" of the area on which siping is given is not more than 60% of width "b", reduction effect of the noise becomes insufficient, and in contrast with this, when 80% is exceeded, the traction performance is reduced. Moreover, even though siping is given on the described-above area of a portion of the subgroove 3 being positioned at the block row 4a of the most-shoulder side, wear resistance and the traction performance improved as mentioned above can not be impaired. Therefore, according to said constitution, wear resistance can be improved without affecting driving performance virtually, moreover, the noise caused by the block patterns can be reduced.

In each block row 4, 5 and 6, the blocks 4a, 5a and 6a are arranged in the circumferential direction of the tire based on the pitches of a plurality of kinds which the length of the circumferential direction of the tire are different respectively. Namely, pitch variation is adopted in order to reduce the noise in this block pattern. On the one hand, width of the subgroove 3 is varied proportional to the length of the pitch of the blocks adjoining each other. Therefore, in this block pattern, a range of variations in a ratio of the groove area every each pitch is regulated not more than five points in one circumference of the tire even though the pitch variation is adopted.

Figure 10:
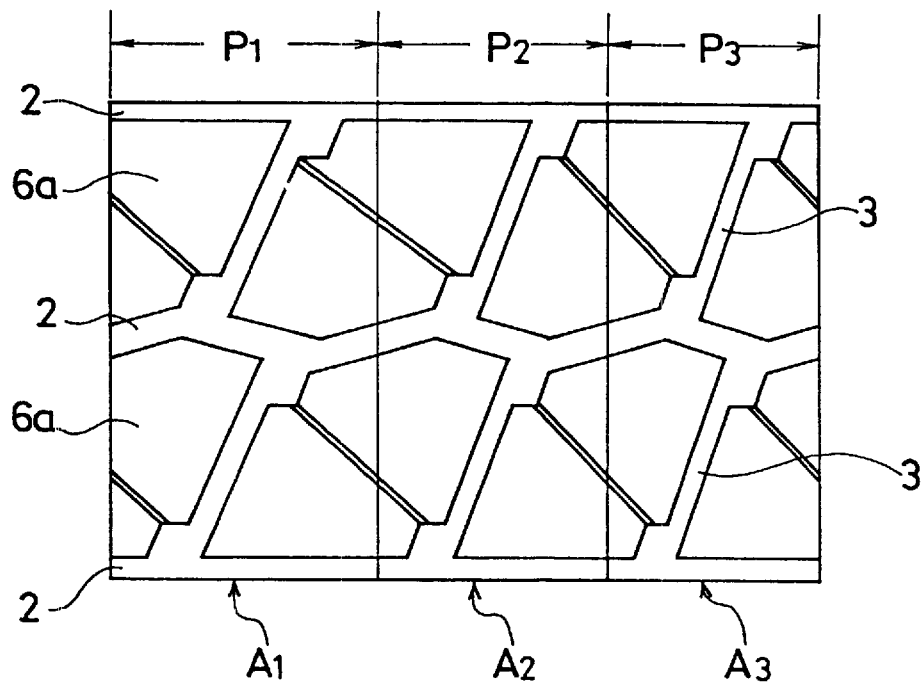
FIG. 10 is a plane view showing the tread pattern shown in FIG. 6, the pattern being segmented into pattern regions based on a pitch.

For example, the block 6a of the center side is arranged in the circumferential direction of the tire based on pitches P1 to P3 as shown in FIG. 10. At this time, in the pattern region A1 to A3 distinguished by the pitches P1 to P3, the ratio of those groove area is decreased in reverse proportion to the length of the pitches P1 to P3, if the width of the subgroove 3 are same. Accordingly, the width of the subgroove 3 is allowed to vary proportional to the length of the pitches P1 to P3, thereby the range of variations in the ratio of the groove area of the pattern region A1 to A3 being able to be decreased.

As is mentioned above, the range of variations in the groove area ratio every each pitch is regulated not more than five points in one circumference of the tire, thereby unbalanced flow of the tread rubber during the vulcanization can be prevented, and variation of the tread gauge can be suppressed so as to maintain preferred uniformity. Even though the range of variations in the groove area ratio every each pitch is regulated within the range described-above, wear resistance and lower noise property improved as mentioned above can not be impaired. Therefore, according to said constitution, wear resistance can be improved without affecting driving performance virtually, moreover, uniformity can be maintained well even though adopting the pitch variation.

Describing further in detail, in each block row 4, 5 and 6, the blocks 4a, 5a and 6a are arranged in the circumferential direction of the tire based on the pitches of at least three kinds which the length of the circumferential direction of the tire are different respectively. Moreover, the pitches of at least three kinds described-above are arranged such that a pitch adjoining to an optional pitch is provided with a length which is the same or the immediately next length in the size order as said optional pitch.

Figure 11:
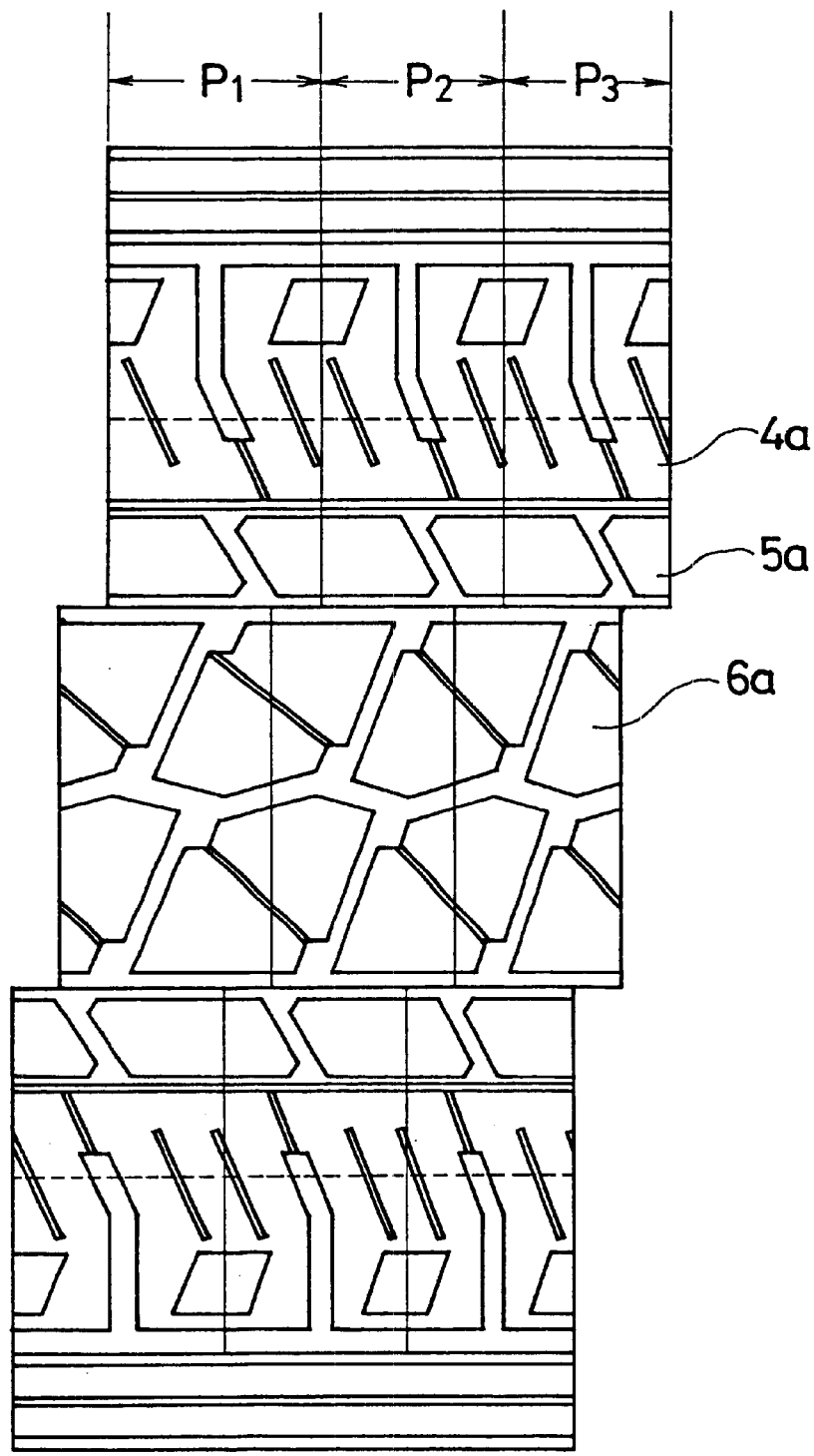
FIG. 11 is a spread view showing the tread pattern shown in FIG. 6 along with the pitch.

For example, the blocks 4a, 5a and 6a are arranged in the circumferential direction of the tire based on the pitches P1 to Pn (where, n=integers of three or more) including the pitches P1, P2 and P3 as shown in FIG. 11. These pitches P1 to Pn is varied in stages such that the length of the circumferential direction of the tire are formed into the relationship of P1>P2>P3> . . . Pn, and are arranged in the circumferential direction of the tire in the regular or irregular order. In the arrangement of the pitch described-above, any one of the pitch P1−i, the pitch P1, or the pitch P1+i is arranged selectively next to the optional pitch Pi (where, i=integers of three to n) inescapably.

As is mentioned above, the pitches are arranged such that a pitch adjoining to an optional pitch is provided with a length which is the same or the immediately next length in the size order as said optional pitch, thereby difference in rigidity of the blocks adjoining to the circumferential direction of the tire being minimized. Therefore, occurrence of uneven wear such as polygonal wearing and cupping caused by the difference in rigidity of the blocks can be reduced. Moreover, even though the arrangement of the pitches of at least three kinds is limited as described-above, wear resistance and lower noise property improved as mentioned above can not be impaired. Threrefore, according to said constitution, wear resistance can be improved without affecting driving performance virtually, moreover, the occurrence of uneven wear of the circumferential direction of the tire can be reduced even though adopting the pitch variation.

Figure 12:
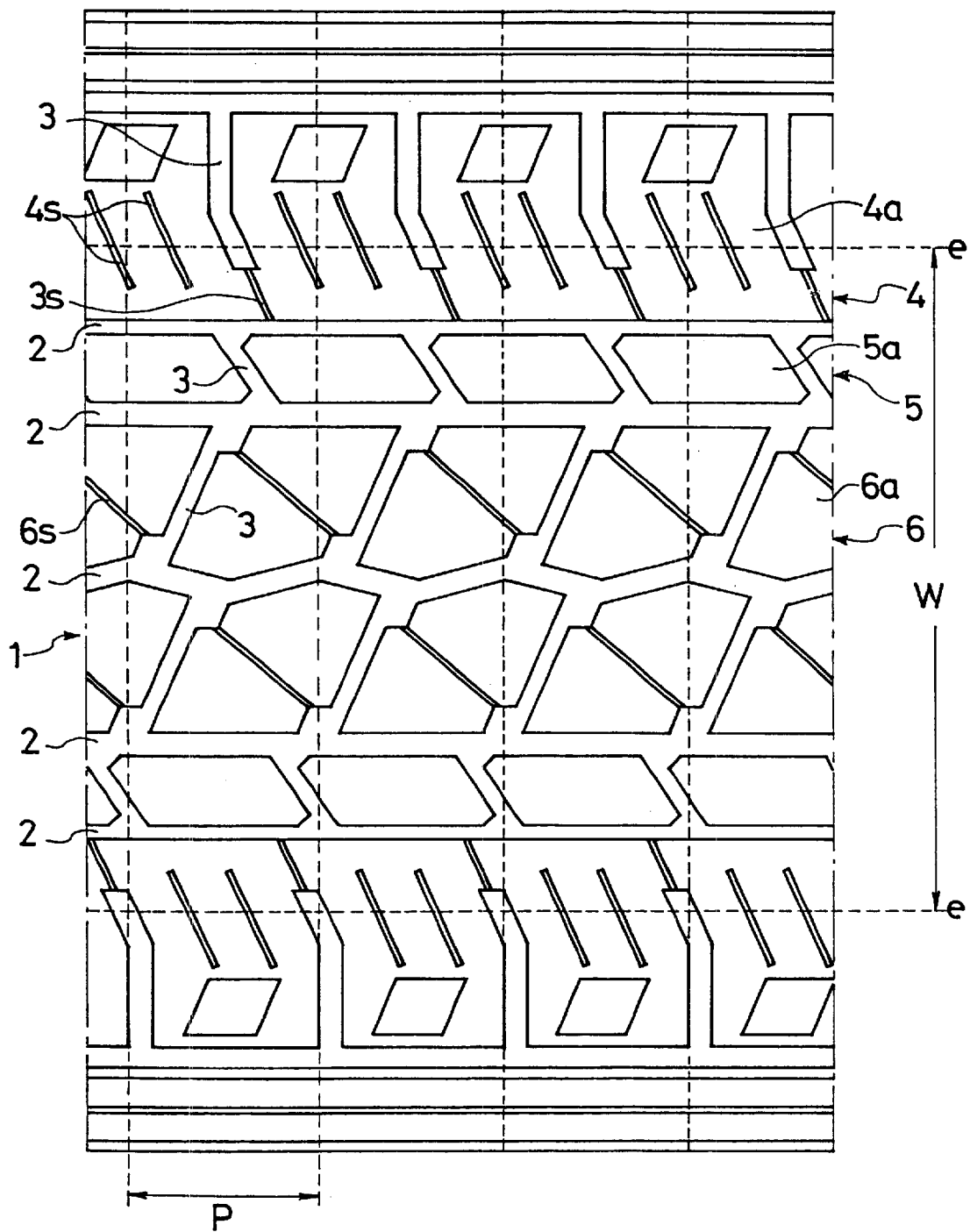
FIG. 12 is a spread view showing a modification of the tread pattern shown in FIG. 6 along with the pitch.

FIG. 12 is a view that the length of the pitch of each block row 4, 5 and 6 are set based on width of the maximum belt layer. As shown in FIG. 12, in each block row 4, 5 and 6, the blocks 4a, 5a and 6a are arranged in the circumferential direction of the tire based on a pitch P respectively. These pitches P may be constant across one circumference of the tire, or the pitch variation where the pitches of a plurality of kinds which the length of the circumferential direction of the tire are different are mixed may be utilized in order for lowering of noise property. In either case of setting the length of the pitch constant, or of adopting the pitch variation, the length of all pitches in each block row is set within the range of 15 to 30% of the width (the maximum belt width) W of the belt layer having the maximum width.

Thus, the length of all pitches in each block row 4, 5 and 6 are set within the range of 15 to 30% of the maximum belt width W, thereby occurrence of uneven wear such as cupping being able to be suppressed. When this length of the pitch is deviated from within the range described-above, uneven wear such as cupping becomes to tend to occur. Moreover, even though each block row 4, 5 and 6 is arranged within the range described-above, wear resistance improved as mentioned above can not be impaired. Therefore, according to said constitution, wear resistance can be improved without affecting driving performance virtually, moreover, the occurrence of uneven wear such as cupping can be suppressed.

Example

Referring to a pneumatic radial tire in which tire size is defined as 185R14 8PR LT, and has the tread pattern as shown in FIG. 6, tires for test respectively were prepared by setting the ratio of the groove area versus the tread area at 25%, as well as setting an area ratio of blocks at 1:1:X from the block row of the shoulder side to the block row of the center side, and varying this X value variously. Moreover, the ratio of the total area of the subgroove versus the total area of the main groove was set at 0.6, and the inclining angle to the circumferential direction of the tire of the subgroove was set at 65°.

Figure 13:
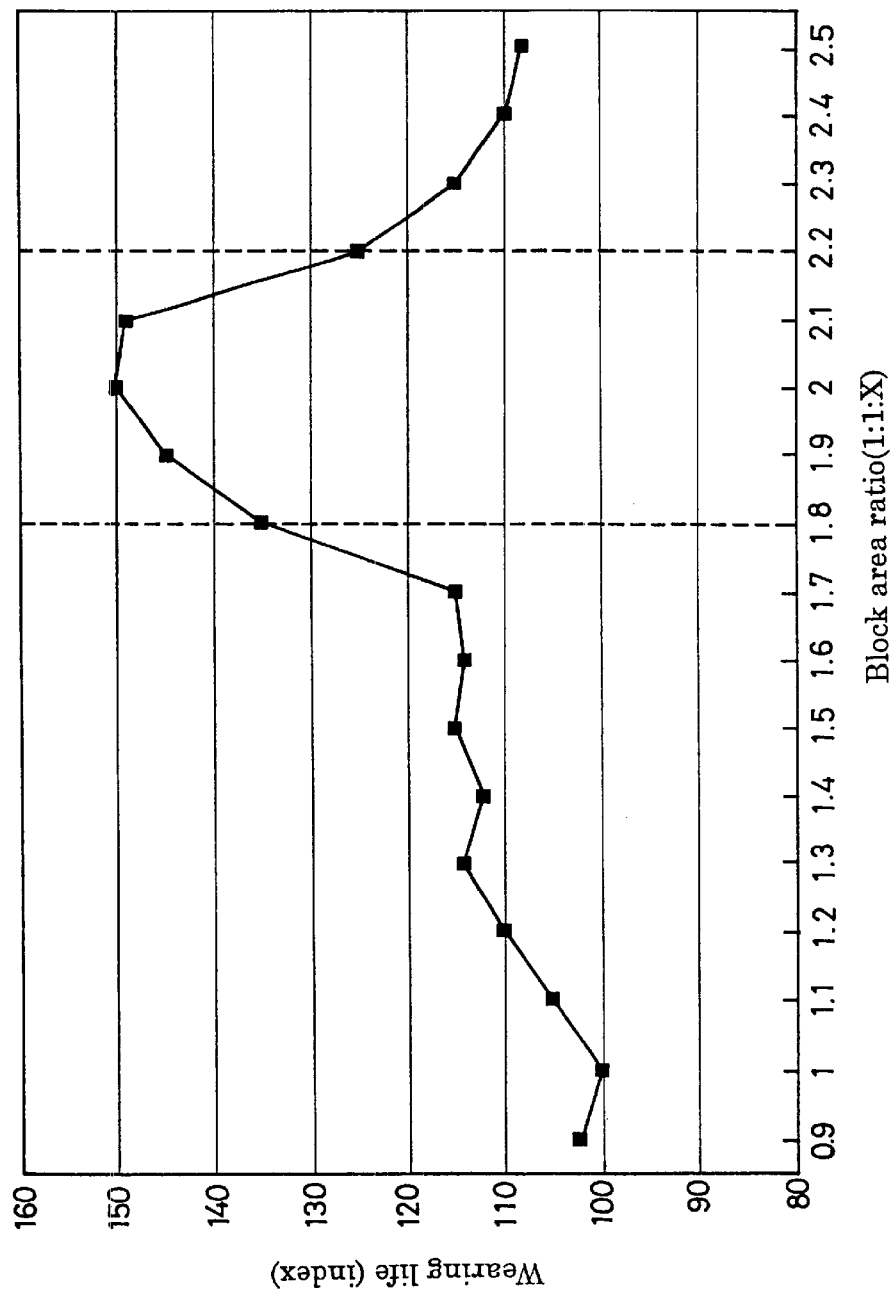
FIG. 13 is a graph showing a relationship between a block area ratio (1:1:X) and wear life (an index).

These tires for test were installed to a light truck with air pressure at 450 kPa, a distance traveled up to reaching wear life (including removal by center wear or uneven wear) was measured, and the result was shown in FIG. 13. The evaluated result was shown by index defining the tire of the prior tire of X=1 as 100. The larger this index value is, the longer wear life is, and wear resistance is excellent. As is understood referring to the FIG. 13, the improvement of wear life has been represented significantly in the range which the area ratio of the block becomes 1:1:1.8 to 2.2.

Next, in the tire described above, the tires for test were prepared by setting the ratio of the groove area versus the tread area at 25%, as well as setting an area ratio of blocks at 1:Y:2 from the block row of the shoulder side to the block row of the center side, and variously varying this Y value.

Figure 14:
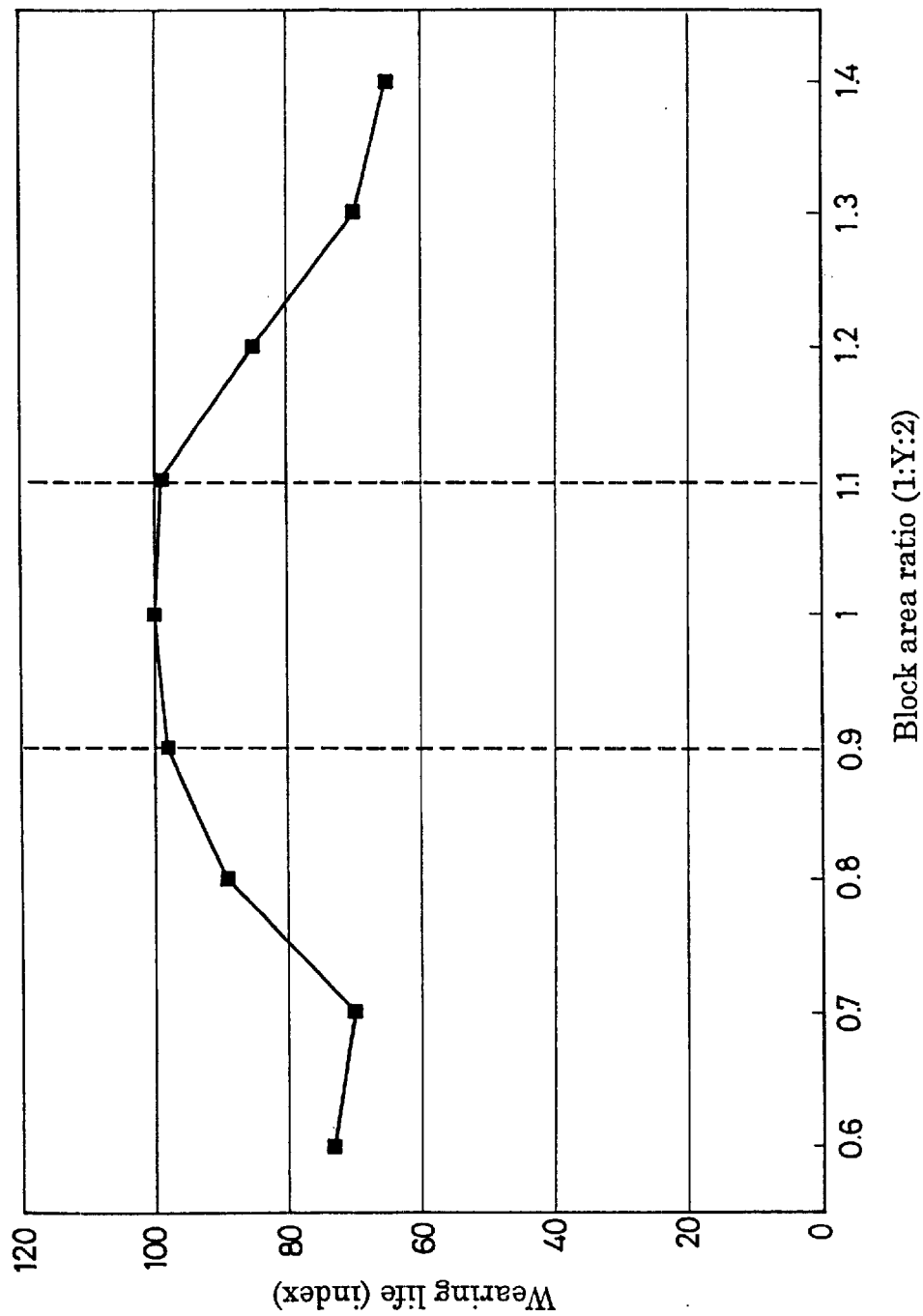
FIG. 14 is a graph showing a relationship between a block area ratio (1:Y:2) and wear life (an index).

These tires for test were installed to the light truck with air pressure at 450 kPa, a distance traveled up to reaching wear life (including removal by center wear or uneven wear) was measured, and the result was shown in FIG. 14. The evaluated result was shown by index defining the tire according to the invention of Y=1 as 100. The larger this index value is, the longer wear life is, and wear resistance is excellent. As is understood referring to the FIG. 14, the improvement of wear life has been represented significantly in the range which the area ratio of the block becomes 1:0.9 to 1.1:2.

Next, in the tire described above, the tires for test respectively were prepared by setting the ratio of the groove area versus the tread area at 25%, as well as setting an area ratio of blocks at the relationship of 1:1:2 from the block row of the shoulder side to the block row of the center side, and variously varying the ratio of the total area of the subgroove versus the total area of the main groove.

Figure 15:
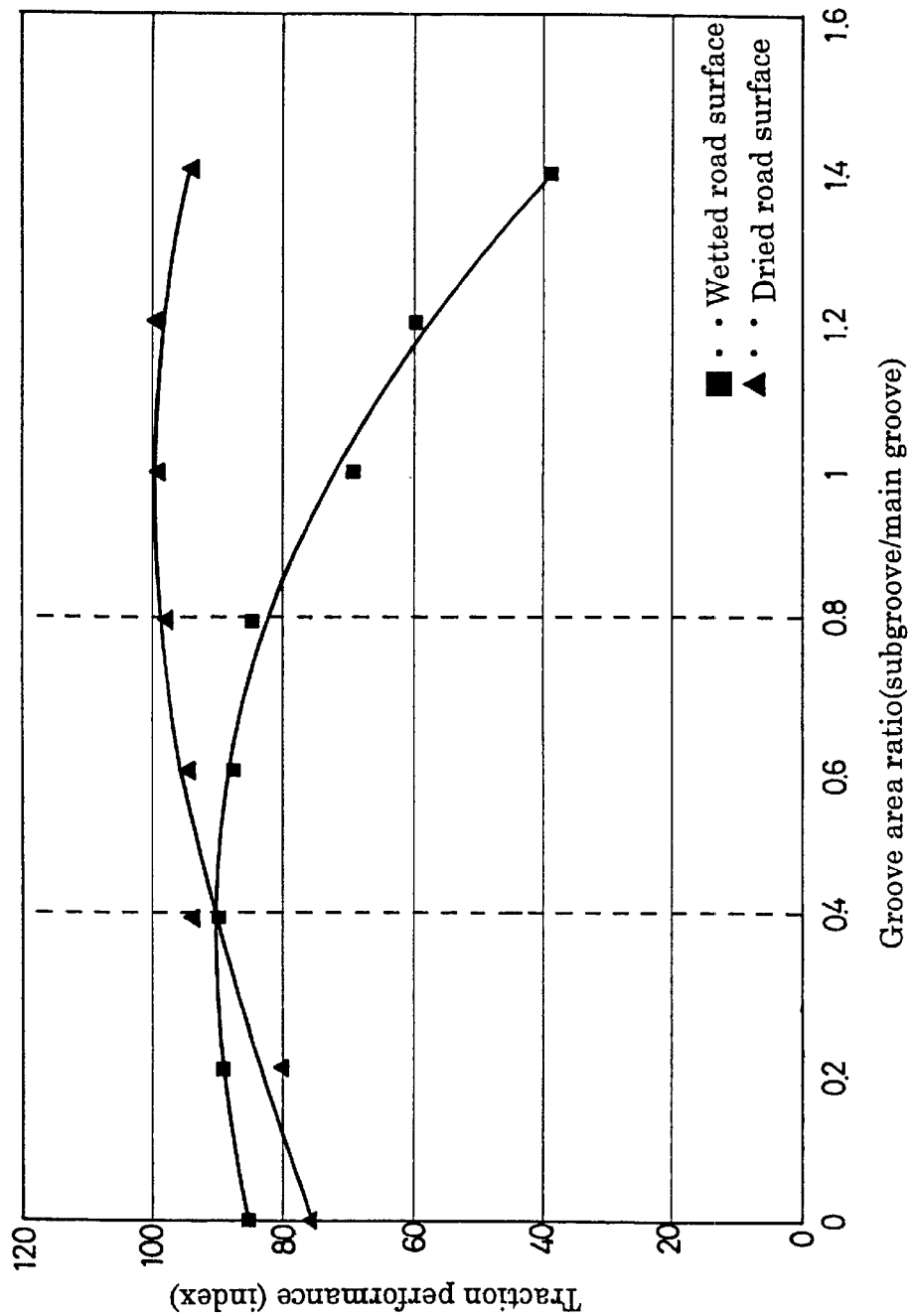
FIG. 15 is a graph showing a relationship between a groove area ratio (the subgroove/the main groove) and a traction performance (an index).

These tires for test were installed to the light truck with air pressure at 450 kPa, a force of traction was measured on the dried road surface and the wetted road surface respectively, and the result was shown in FIG. 15. The evaluated result was shown by index defining the force of traction of a comparison tire which the groove area ratio (the sub groove/the main groove) was defined as 1 on the dried road as 100. The larger this index value is, the more excellent traction performance is. As is understood referring to the FIG. 15, both the traction performance on the dried road and the traction performance on the wetted road were good in the range which the ratio of the groove area (the sub groove/the main groove) becomes 0.4 to 0.8.

Referring to a pneumatic radial tire in which tire size is defined as 175R14 8PR LT, and has the tread pattern as shown in FIG. 6, tires for test respectively were prepared by setting the ratio of the groove area versus the tread area at 25%, as well as setting an area ratio of blocks at 1:1:2 from the block row of the shoulder side to the block row of the center side, further setting the cord angle to the circumferential direction of the tire of the most outside belt layer at 20°, and variously varying an inclining angle of the acute angle side of the subgroove with respect to its cord direction.

Figure 16:
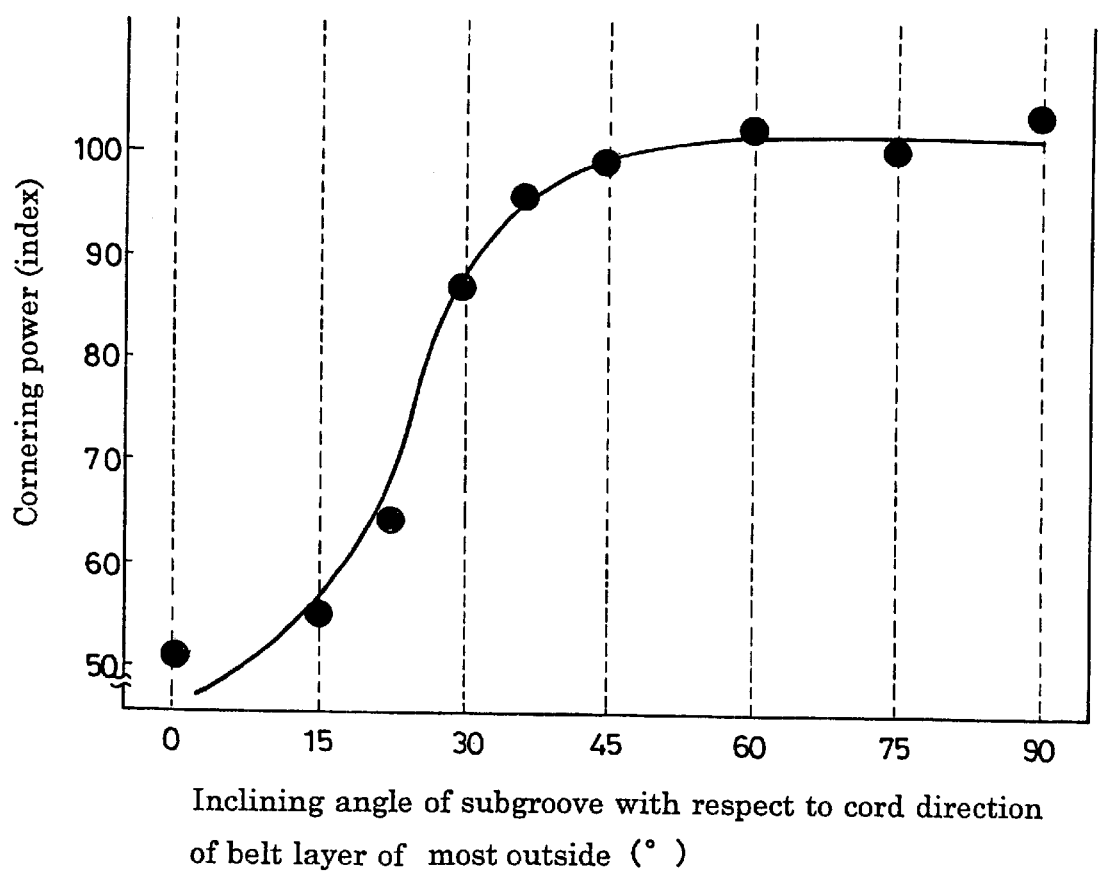
FIG. 16 is a graph showing a relationship between an inclining angle of the subgroove with respect to the direction of a cord of a most outside belt layer and a cornering power (an index).

These tires for test were installed to the wheel of rim size 14×5J to mount to a flat belt type tire testing machine to measure cornering power (CP) under the condition of air pressure at 450 kPa, a load at 7.6 kN, speed at 10 km/h and slip angle at ±1°, the average of the cornering power for both the inclining direction was obtained, and the result was shown in FIG. 16. The evaluated result was shown by index defining cornering power (CP) of the tire having rib patterns of six rows as 100. It means that the larger this index value is, the larger the cornering power is. As is understood referring to the FIG. 16, when the inclining angle of the subgroove with respect to the cord direction of the most outside belt layer is 30° or more, preferably 45° or more, the large cornering power can be obtained, that is, the operation stability has been improved.

Referring to a pneumatic radial tire in which tire size is defined as 175R14 8PR LT, and has the tread pattern as shown in FIG. 6, the tires for test respectively were prepared by setting the ratio of the groove area versus the tread area at 25%, as well as setting an area ratio of blocks at 1:1:2 from the block row of the shoulder side to the block row of the center side, and variously varying the variation ratio of the total ground length at the ground front edge in one circumference of the tire.

Figure 17:
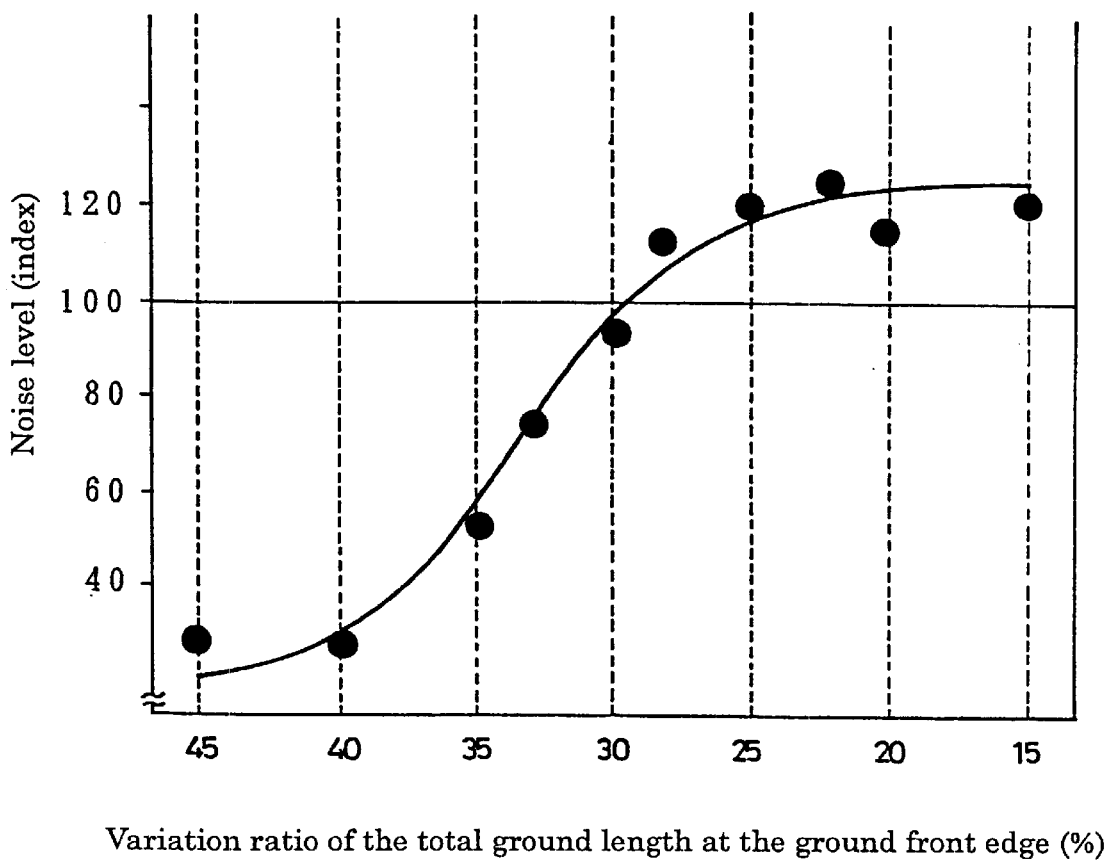
FIG. 17 is a graph showing a relationship between a variation ratio of a total ground length at a ground front edge and a noise level (an index).

These tires for test were installed to the light truck to measure noise level at complying with "Noise measurement method" described in JASO C606-86, and the result was shown in FIG. 17. The evaluated result was shown using the inverse of the noise level measured, by index defining the inverse of the noise level of the tire (the variation ratio of the total ground length at the ground front edge: approximately 30%) having the general block pattern as 100. It means that the larger this index value is, the lower the noise level is. As is understood referring to the FIG. 17, when the variation ratio of the total ground length at the ground front edge is not more than 25%, the noise level has been reduced significantly.

Referring to a pneumatic radial tire in which tire size is defined as 175R14 8PR LT, and has the tread pattern as shown in FIG. 6, the tires for test respectively were prepared by setting the ratio of the groove area versus the tread area at 25%, as well as setting an area ratio of blocks at 1:1:2 from the block row of the shoulder side to the block row of the center side, and variously varying the ratio (%) of the width "a" of the range on which siping is given versus the block width "b" of block row of the most-shoulder side.

Figure 18:
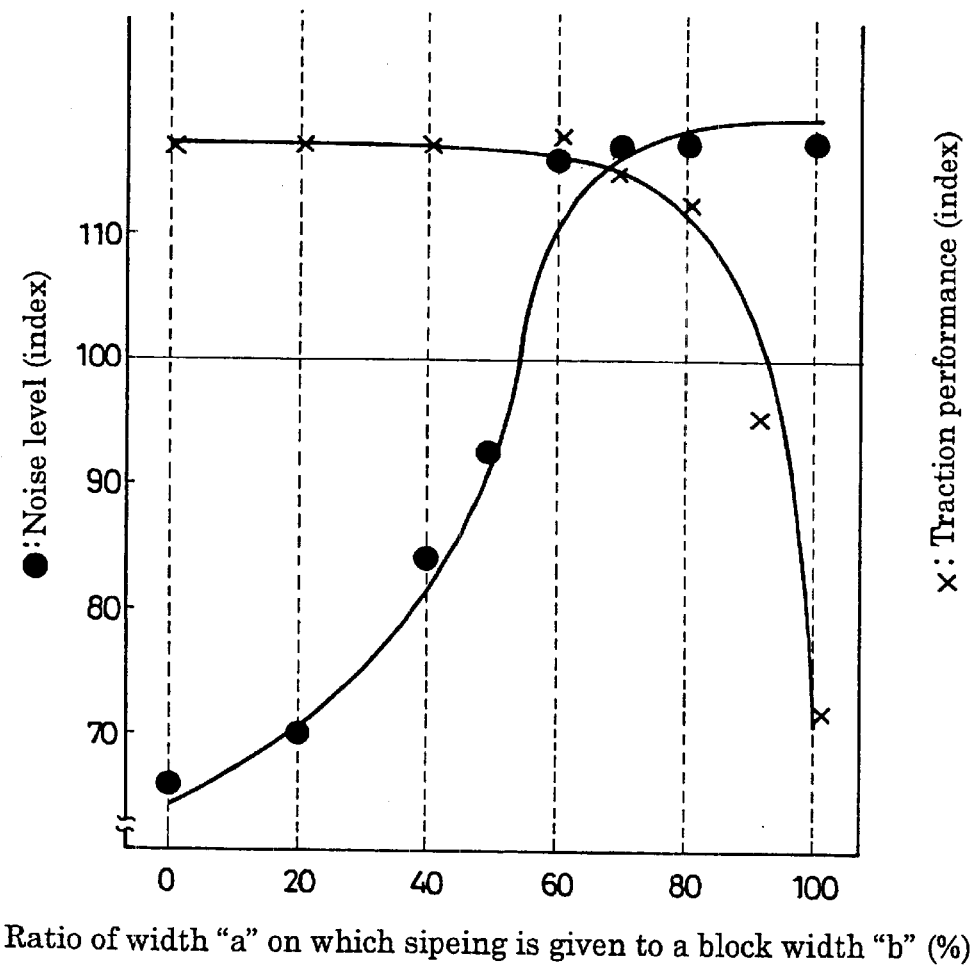
FIG. 18 is a graph showing a relationship between a ratio (%) of width "a" on which siping is given versus a block width "b" and a noise level (an index) and a traction performance (an index).

These tires for test were installed to the light truck to measure noise level at complying with "Noise measurement method" described in JASO C606-86, and the result was shown in FIG. 18.

The evaluated result was shown using the inverse of the noise level measured, by index defining the inverse of the noise level of the tire having the general block pattern as 100. It means that the larger this index value is, the lower the noise level is.

Moreover, these tires for test were installed to the light truck with air pressure at 450 kPa, a force of traction was measured on the unleveled road surface, thereby traction performance being evaluated, and the result was shown in FIG. 18 together. The evaluated result was shown by index defining the force of traction of the tire having the general block pattern as 100. The larger this index value is, the more excellent traction performance is. As is understood referring to the FIG. 18, when the ratio of the width "a" on which siping is given versus the block width "b" is 60 to 80%, the noise level and traction performance can be improved together.

Referring to a pneumatic radial tire in which tire size is defined as 175R14 8PR LT, and has the tread pattern as shown in FIG. 6, tires for test respectively were prepared by setting the ratio of the groove area versus the tread area at 25%, as well as setting an area ratio of blocks at 1:1:2 from the block row of the shoulder side to the block row of the center side, further adopting the pitch variation described below as the block pattern, and variously varying the range of variations in the ratio of the groove area every each pitch around one circumference of the tire.

The pitch variation was constituted by setting a ratio of three kinds of pitch A, B and C at A:B:C=6:5:4, setting a ratio of the maximum pitch and the minimum pitch at 1.5, as well as setting the number of the total pitch at 67, in order described below:

BBCCC CCBBA AABBB BCCCC CBBAB BBBBC CCCCB ABBBC CCCBB BAAAA BBBCC BBBBB AAABB CC.

Moreover, difference in the ratio of the groove area of the pitch A and the pitch C was varied by changing the width of the subgroove as required on a base (25%) of the ratio of the groove area of the pitch C. Moreover, the pitch B was set at the intermediate value of the pitch A and the pitch C. For example, when the range of variations in the ratio of the groove area was set at five points, the ratio of the groove area of the pitch A was set at 20%, the ratio of the groove area of the pitch B was set at 22.5% and the ratio of the groove area of the pitch C was set at 25%.

Figure 19:
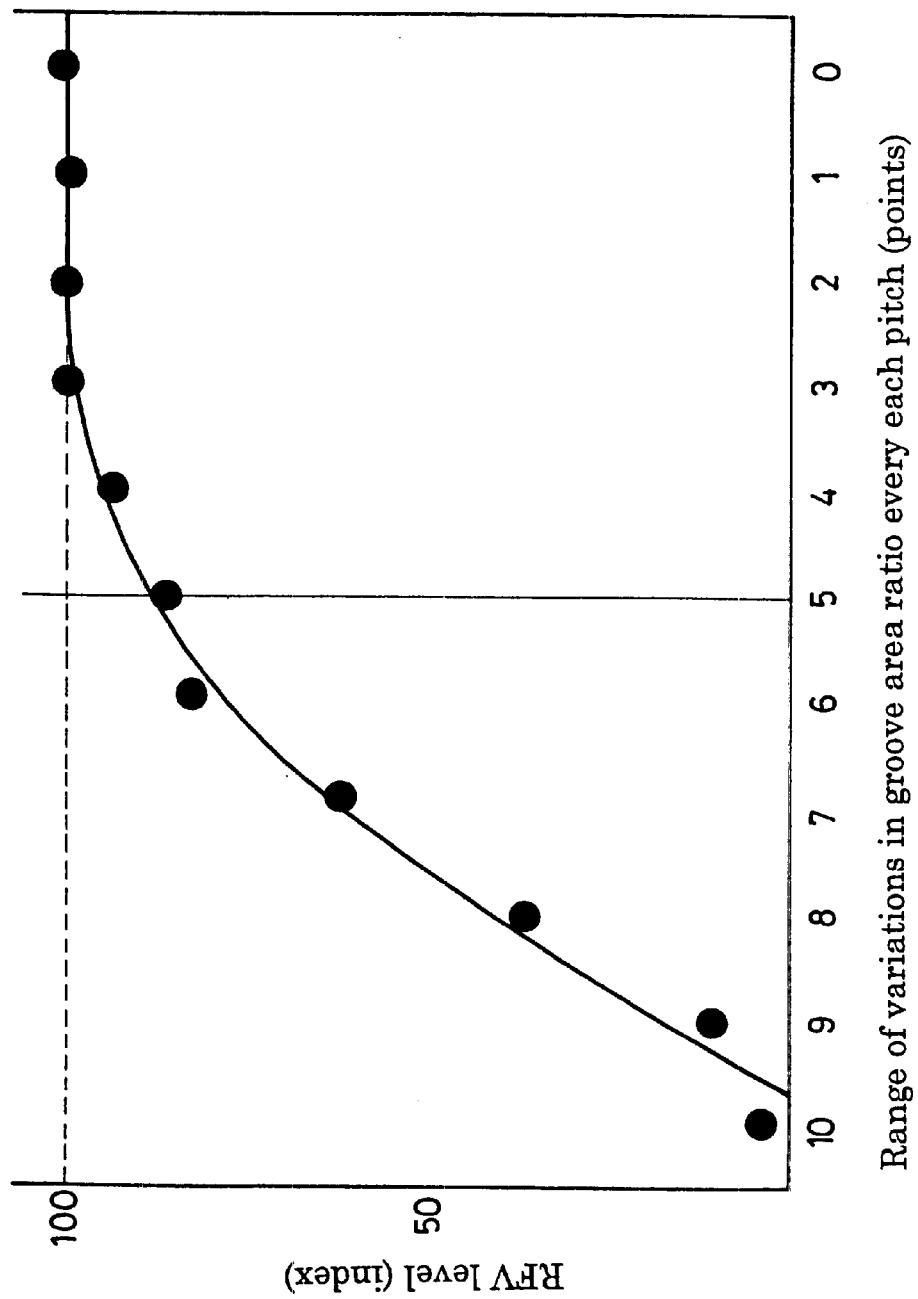
FIG. 19 is a graph showing a relationship between a range of variations in a groove area ratio every each pitch and RFV level (an index).

For these tires for test, radial force variation was measured at complying with "Uniformity examination method" described in JASO C607, and the result was shown in FIG. 19. The evaluated result was shown using the inverse of the measured value, by index defining the inverse of RFV level of the tire (single 67 pitches) which no pitch variation was adopted as 100. It means that the larger this index value is, the lower the RFV level is and uniformity is excellent. As is understood referring to the FIG. 19, when the range of variations in the ratio of the groove area every each pitch is not more than five points, good uniformity can be obtained.

Next, referring to a pneumatic radial tire in which tire size is defined as 175R14 8PR LT, and has the tread pattern as shown in FIG. 6, tires 1 and 2 according to the invention respectively were prepared by setting the ratio of the groove area versus the tread area at 25%, as well as setting an area ratio of blocks at 1:1:2 from the block row of the shoulder side to the block row of the center side, further adopting the pitch variation as the block pattern, and setting its pitch arrangement described below.

The pitch variation was constituted by setting a ratio of three kinds of pitch A, B and C at A:B:C=6:5:4, setting a ratio of the maximum pitch and the minimum pitch at 1.5, as well as setting the number of the total pitch at 67, in order described below:

Tire 1 according to the invention BBCCC CCBBA AABBB BCCCC CBBAB BBBBC CCCCB ABBBC CCCBB BAAAA BBBCC BBBBB AAABB CC.

Tire 2 according to the invention BBCCA CCBBA CABBB BCCAC CBBAB BBBBC CCACB ABBBC CCCBB BACAA BBBCC BBBBB ACABB CC.

These tires for test were installed to the wheel of rim size 14×5J to mount to a light truck with air pressure at 450 kPa, and was made to drive 4000 km mainly composed of slalom driving on the circular road paved with asphalt at speed 60 km/h, and then height of both ends of the block adjoining in the circumferential direction of the tire, sandwiching the subgroove, were measured at a plurality of points of the circumferential direction of the tire, thereby its wear step being determined. As a result, the maximum wear step was 1.5 mm, and the average wear step was 0.66 mm in the tire 2 according to the invention. On the other hand, the maximum wear step was 0.4 mm, and the average wear step was 0.25 mm in the tire 1 according to the invention.

Next, referring to a pneumatic radial tire in which tire size is defined as 175R14 8PR LT, and has the tread pattern as shown in FIG. 12, the tires for test respectively were prepared by setting the ratio of the groove area versus the tread area at 25%, as well as setting an area ratio of blocks at 1:1:2 from the block row of the shoulder side to the block row of the center side, further constituting each block row with single pitches, and variously varying a ratio of a pitch length versus the maximum belt width.

These tires for test were installed to the wheel of rim size 14×5J to mount to a light truck with air pressure at 450 kPa, and was made to drive 4000 km mainly composed of slalom driving on the circular road paved with asphalt at speed 60 km/h, and then height of both ends of the block adjoining in the circumferential direction of the tire, sandwiching the subgroove, were measured at a plurality of points of the circumferential direction of the tire, thereby its wear step (the amount of cupping) being determined, and its result was shown in FIG. 20. The evaluated result was shown using the inverse of the measured value, by index defining the inverse of the amount of cupping caused in the tire which has four block row, as well as in which the ratio of a pitch length versus the maximum belt width was set at 25%. The larger this index value is, the less the amount of cupping is, and the more excellent one side wear resistance is. As is understood referring to the FIG. 20, when the ratio of a pitch length versus the maximum belt width was set at 15 to 30%, the amount of cupping was less, and uneven wear resistance was excellent.

What is claimed is:

1. A pneumatic radial tire, comprising:

five main grooves provided on a tread and extending in a tire circumferential direction to divide the tread into six rows of land portions; and a plurality of subgrooves provided on the tread and extending in a tire width direction to divide each of the land portions into a plurality of blocks, wherein the tread consists of six block rows including a first block row at each shoulder side, a second block row adjacent to the first block row toward a center side and a third block row adjacent to the second block row toward the center side;

wherein an area ratio of the blocks of the first block row to the blocks of the second block row to the blocks of the third block row is set at a relationship of 1:0.9 to 1.1:1.8 to 2.2 in a region between ends of a belt layer having a maximum width embedded in the tread; and wherein the ratio of a groove area to a tread area is set within the range of 15% to 35%.

2. The pneumatic radial tire according to claim 1, wherein the ratio of a total area of said subgrooves to a total area of said main groove is set at 0.4 to 0.8.

3. The pneumatic radial tire according to claim 1, wherein the inclining angle with respect to the circumferential direction of the tire of said subgroove is set within the range of 65±10°.

4. The pneumatic radial tire according to claim 1, wherein the ratio of a projected length when projecting in the direction of width of the tire to a projected length when projecting in the circumferential direction of the tire of said subgroove is set at 0.6 to 0.8.

5. The pneumatic radial tire according to claim 1, wherein the ratio of a radius of the tire in a section along the equator of the tire to a radius of the tread in a section along a meridian of the tire is set at 0.8 to 1.2.

6. The pneumatic radial tire according to claim 1, wherein the inclining direction of said subgroove is formed in the different direction each other in a block row of a shoulder side and in a block row of a center side.

7. The pneumatic radial tire according to claim 1 comprising non-directional tread pattern.

* * * * *